United States Patent [19]

Kawano et al.

[11] Patent Number: 4,782,805
[45] Date of Patent: Nov. 8, 1988

[54] CONTROL DEVICE FOR THROTTLE VALVE FOR INTERNAL COMBUSTION ENGINE

[75] Inventors: Hirotoshi Kawano, Katsuta; Shozo Yanagisawa, Ibaraki; Tadao Osawa, Katsuta; Toshifumi Usui, Katsuta; Yutaka Takaku, Katsuta, all of Japan

[73] Assignee: Hitachi, Ltd., Tokyo, Japan

[21] Appl. No.: 919,477

[22] Filed: Oct. 16, 1986

[30] Foreign Application Priority Data

Oct. 16, 1985 [JP] Japan .................. 60-228732
Dec. 2, 1985 [JP] Japan .................. 60-269285

[51] Int. Cl.$^4$ .......................................... F02D 11/04
[52] U.S. Cl. ...................... 123/403; 74/513; 261/65
[58] Field of Search ............... 123/401, 403; 261/65; 74/513

[56] References Cited

U.S. PATENT DOCUMENTS

| 1,766,867 | 6/1930 | Woolson | 123/403 |
| 2,747,848 | 5/1956 | Kehoe | 261/65 |
| 2,841,373 | 7/1958 | Broge | 261/65 |
| 2,927,476 | 3/1960 | Hutzenlaub et al. | 74/513 |
| 4,057,130 | 11/1977 | Robertson | 74/513 |

FOREIGN PATENT DOCUMENTS 1082767 11/1960 Fed. Rep. of Germany .
0011372 5/1966 Japan .
0095144 5/1985 Japan .

Primary Examiner—Willis R. Wolfe, Jr.
Attorney, Agent, or Firm—Antonelli, Terry & Wands

[57] ABSTRACT

A control device for a throttle valve for use with an internal combustion engine installed in a vehicle. The device has a throttle valve shaft secured to the throttle valve, and a linkage to be driven by a linkage member including an accelerator wire for opening and closing the throttle valve. The linkage is a three-joint linkage mechanism including a throttle lever secured to the throttle valve shaft, a lever-mounting shaft secured to the throttle body, a drive lever rotatably mounted on the lever-mounting shaft, and a rod connecting the throttle lever and the drive lever.

3 Claims, 4 Drawing Sheets

CONTROL DEVICE FOR THROTTLE VALVE FOR INTERNAL COMBUSTION ENGINE

BACKGROUND OF THE INVENTION

The present invention relates to a control device for a throttle valve for use with an internal combustion engine, and more particularly to a throttle valve control mechanism which is suitable for improving the driveability of the vehicle equipped with the engine and the responsive chracteristic of the throttle valve.

A conventional control device for a throttle valve used with an internal combustion engine has such a structure that when the driver depresses the accelerator pedal, the amount by which the pedal is depressed is directly transmitted to the shaft of the throttle valve through a linkage mechanism or a cable provided in the relevant vehicle, thus determining the opening degree of the throttle valve. With a throttle valve controlled by means of such a conventional control device, however, since the opening of the throttle valve and the amount by which the accelerator pedal is depressed by the driver are in such a relationship that the former is directly proportionally determined by the latter, following disadvantages often result: Namely, the pressing force tends to be strong when the driver starts to depress the accelerator pedal, thus causing a sudden increase in the throttle valve opening and accordingly a rapid acceleration; the consequent vibration experienced by the vehicle due to the thrust caused by this rapid acceleration results in a great deterioration of the driveability of the vehicle in the low speed region of the engine. On the other hand, if such an arrangement is made that the throttle valve opening will be small relative to the amount of depression of the accelerator pedal with the intention of improving the driveability in the low speed region, this may result in a deterioration in the responsive characteristic of the throttle valve to the driver's operation of the accelerator pedal in the high speed region of the engine.

SUMMARY OF THE INVENTION

It is an object of the present invention to eliminate the disadvantages encountered by the prior art, and to provide a control device for a throttle valve for use with an internal combustion engine installed in a vehicle, which is capable of improving the vehicle driveability in the low speed region of the engine and of improving the responsive characteristic of the throttle valve in the high speed region of the engine.

The present invention provides a control device for a throttle valve arranged in an intake passage formed in a throttle body of an internal combustion engine installed in a vehicle, which has a throttle valve shaft secured to the throttle valve, and a linkage to be driven by a linkage member connected to the accelerator pedal for opening and closing the throttle valve. The above linkage has a throttle lever secured to the throttle valve shaft, a lever-mounting shaft having an axis parallel to the axis of the throttle valve shaft and secured to the throttle body, a drive lever rotatably mounted on the lever-mounting shaft, and a rod connecting the throttle lever and the drive lever, the linkage member being connected to the drive lever at a position displaced laterally with respect to a virtual line connecting the point at which the drive lever is mounted on the lever-mounting shaft and the point at which the drive lever is connected to the rod.

DESCRIPTION OF THE PREFERRED EMBODIMENT

Figure 1:
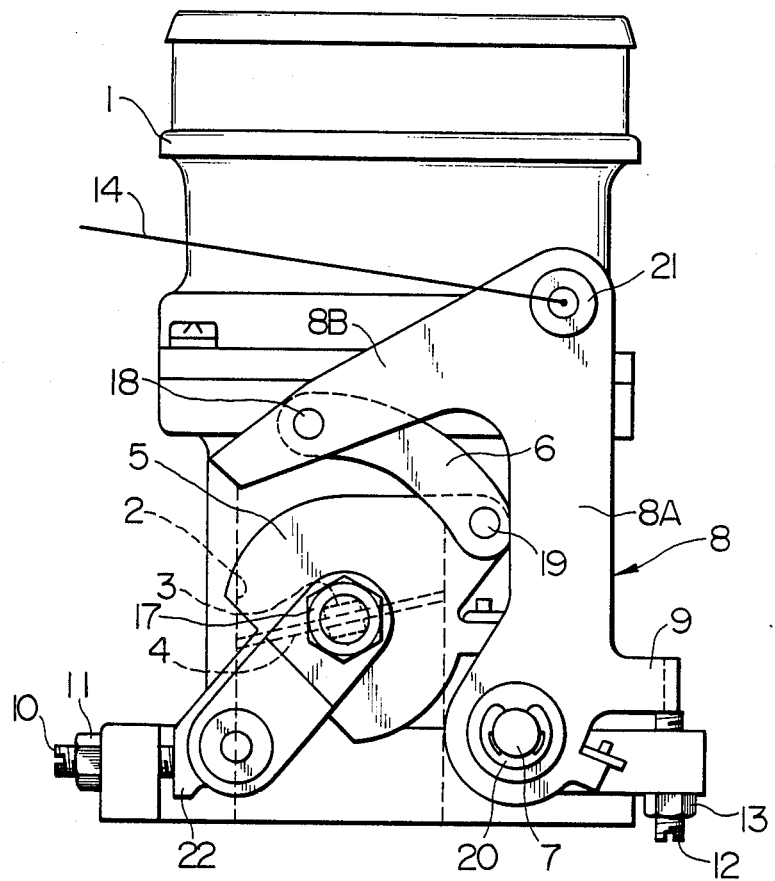
FIG. 1 is a side view of an embodiment of a throttle valve control device in accordance with the invention.

A preferred embodiment of the invention will be described below with reference to FIGS. 1 and 2. A throttle body 1 has an intake passage 2 formed therein for an internal combustion engine installed in a vehicle. In the intake passage 2, a throttle valve shaft 3 is supported through two bearings, not shown. A throttle valve 4 is integrally fixed to the throttle valve shaft 3, whereby the throttle valve is opened or closed by rotation of the throttle valve shaft 3. Reference number 5 denotes a throttle lever an end of which is force-fitted onto the throttle valve shaft 3 and fixed to the same by means of a nut 17. A pin 19 is fixed to another end of the throttle lever 5, and a rod 6 is arranged to be rotatably fitted at one end thereof on this pin 19. A lever-mounting shaft 7 is forced in and secured to the throttle body 1. A drive lever 8, to which a collar (not shown) is integrally fixed, is rotatably mounted on the shaft 7, with its axial position on the shaft 7 being limited by a clip 20. Fixed to this drive lever 8 are a pin 21 for fixing an accelerator wire 14 connected to the accelerator pedal of the vehicle, and a pin 18 on which the other end of the rod 6 is mounted. Torsion coil springs 15 and 16 are provided respectively for the throttle lever 5 and the drive lever 8, which springs 15 and 16 generate torque in the clockwise direction in FIG. 1. These springs 15 and 16 have spring forces which are necessary and sufficient for returning the throttle valve 4 to the closed position thereof against various frictional forces. The device includes an adjusting screw 10 arranged on the throttle body 1 by being fixed thereto by means of a nut 11 at such a position as to be in contact with a stopper portion 22 forming part of the throttle lever 5, thereby setting the idling condition of the throttle valve 4. The device further includes another adjusting screw 12 fixed on the throttle body 1 by means of a nut 13 and disposed at such a position as to be in contact with a stopper portion 9 forming part of the drive lever 8, thereby determining the initial position of the drive lever 8.

Figure 2:
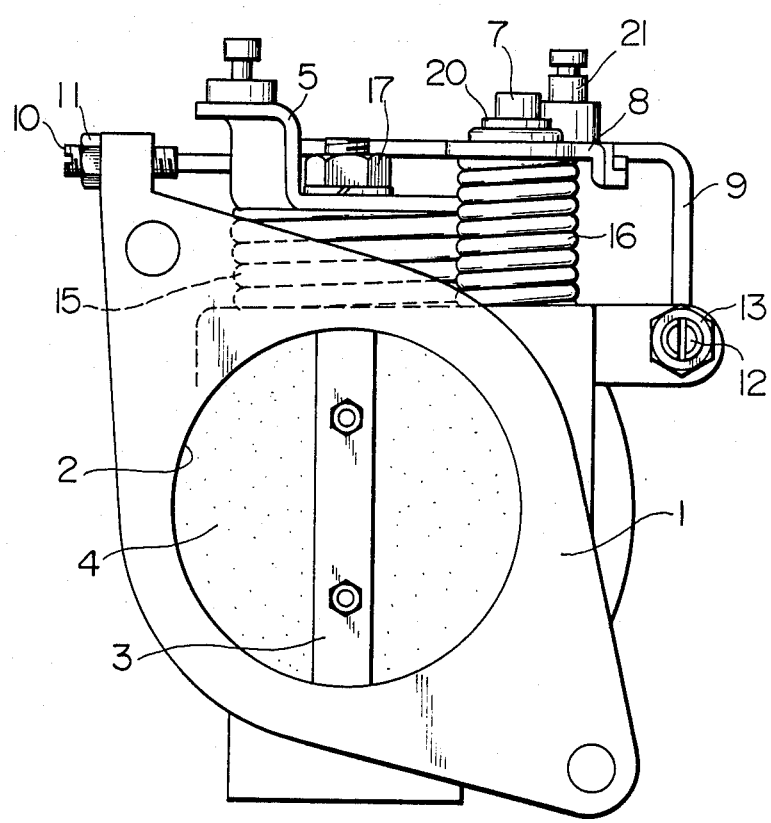
FIG. 2 is a bottom view of the embodiment of the throttle device of the invention shown in FIG. 1.
Figure 4:
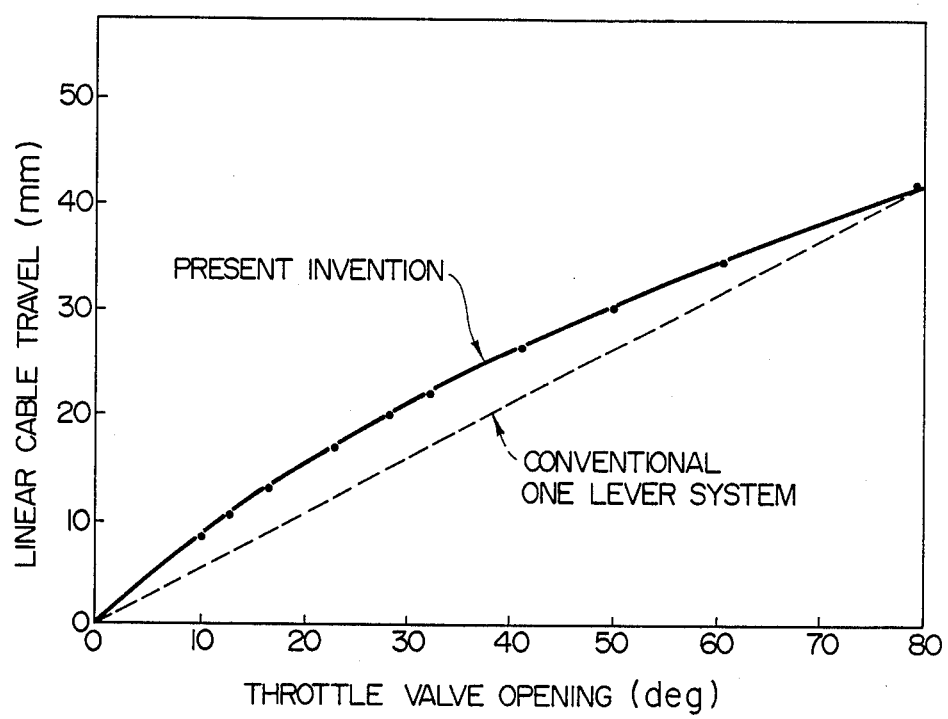
FIG. 4 is a graph showing the relationship between the linear throttle wire travel and the throttle valve opening in accordance with the present invention and that obtained in the prior art.

As shown in FIGS. 1 and 2, while the throttle lever 5 and the rod 6 are formed of generally linear members, the drive lever 8 has a pair of arms 8a and 8b which are joined in the shape of the letter L. The free end of one arm 8a is pivotally mounted on the shaft 7, and that of the other arm 8b is pivotally mounted on the rod 6 through the pin 18. The pin 21 to which the throttle wire 14 is fixed is mounted in the vicinity of the joint of these arms 8a and 8b. Therefore, the pin 21 is displaced in the lateral direction with respect to a virtual line connecting the shaft 7 and the pin 18, and by virtue of this displaced position of the pin 21, a throttle valve opening characteristic relative to the linear travel of the accelerator wire 14 such as that indicated by the solid line in FIG. 4 can be obtained. That is, when the driver starts to depress the accelerator pedal, the throttle valve opening is small with respect to the amount of depression of the accelerator pedal, i.e. relative to the linear travel of the accelerator wire 14, and conversely in the high speed region of the engine, the throttle valve opening is large with respect to the linear travel of the accelerator wire 14, thereby improving the responsive characteristic of the throttle valve 4, rather than improving the driveability of the vehicle.

The operation of the control device in accordance with the embodiment of the invention will now be described with reference to FIG. 3 which schematically shows the control device shown in FIGS. 1 and 2.

Figure 3:
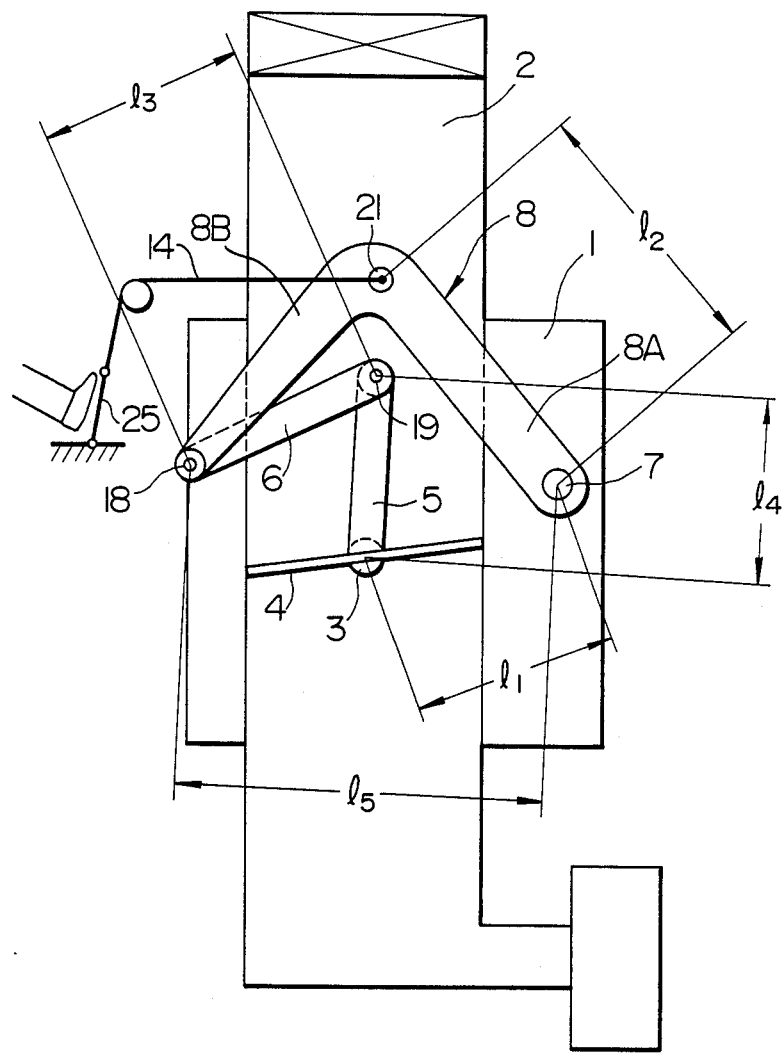
FIG. 3 is a view schematically showing the linkage in the device shown in FIGS. 1 and 2.

When the driver depresses the accelerator pedal 25 in the driver's seat, the accelerator wire 14, which serves as part of a linkage member, is pulled in the leftward direction as viewed in FIG. 3. The pressing force is transmitted to the pin 21 through the wire 14 as it moves, thereby causing rotation of the drive lever 8 in the counter-clockwise direction as viewed in FIGS. 1 and 3. The rotation of the drive lever 8 causes rotation of the throttle lever 5 through the pin 18, the rod 6, and the pin 19. The linkage between the drive lever 8 and the throttle lever 5 may be arbitrarily determined by suitably selecting the various specifications of this three-joint linkage mechanism. More specifically, the characteristic of the throttle valve opening can be determined in accordance with the requirements of the vehicle driveability and the responsive characteristic of the throttle valve by suitably selecting sizes $l_1$–$l_5$ of the component parts of which the linkage consists, as shown in FIG. 3. For instance, in the embodiment illustrated in FIG. 3, the sizes of the component parts are set to take the following values: $l_1=35$ mm; $l_2=72$ mm; $l_3=27$ mm; $l_4=28$ mm; and $l_5=54.2$ mm.

In the linkage which is structured as described above, since slight clearances are provided in the sliding parts of the lever-mounting shaft 7 and pins 18 and 19 for the purpose of ensuring smooth rotation of the associated levers and rod, certain play occurs while the movement of the accelerator wire 14 is being transmitted to the throttle lever 5 fixed to the throttle valve shaft 3, and this play may produce a corresponding degree of play in the accelerator system. Therefore, the head of the adjusting screw 12 arranged on the throttle body 1 is brought into contact with the stopper portion 9 of the drive lever 8, thereby reducing the degree of play in the linkage below an allowable limit above which the reduction might adversely affect the set condition of the throttle lever 5 for determining the idling condition of the throttle valve 4, thus removing the risk of causing the driver to experience any unpleasant feeling.

We claim:

1. A control device for a throttle valve arranged in an intake passage formed in a throttle body of an internal combustion engine installed in a vehicle, which has a throttle valve shaft secured to said throttle valve, and a linkage to be driven by a linkage member connected to the accelerator pedal for opening and closing said throttle valve;

said linkage has a throttle level secured at an end thereof to said throttle valve shaft, a lever-mounting shaft at said throttle body, a drive lever having a pair of arms joined at apex to form an L-shape lever such that the arms straddle said throttle valve, a free end of one of the arms being rotatably mounted on said lever-mounting shaft, and a rod connecting another end of said throttle lever and a free end of the other arm of said drive lever, said throttle lever generally extending toward the apex of said L-shaped lever, sand linkage member being connected at the apex of said dive lever so as to be at a position displaced laterally with respect to a virtual line connecting the point on said one arm at which said drive lever is pivotably mounted on said lever-mounting shaft and the point on said other arm at which said drive lever is connected to said rod.

2. A control device for a throttle valve as claimed in claim 1, including adjusting members respectively provided for said throttle lever and said drive lever for determining the respective initial positions of said throttle lever and said drive lever.

3. A control device for a throttle valve as claimed in claim 2, wherein said adjusting members are adjusting screws arranged on said throttle body.

* * * * *